(12) United States Patent
Elias-Palacios

(10) Patent No.: US 9,413,254 B2
(45) Date of Patent: Aug. 9, 2016

(54) DC-DC CONVERSION CIRCUIT AND METHOD OF PROTECTING DEVICES THEREIN

(71) Applicant: Continental Automotive Systems, Inc., Auburn Hills, MI (US)

(72) Inventor: Sergio Adolfo Elias-Palacios, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 118 days.

(21) Appl. No.: 14/489,176

(22) Filed: Sep. 17, 2014

(65) Prior Publication Data

US 2016/0079869 A1 Mar. 17, 2016

(51) Int. Cl.
*H02M 3/335* (2006.01)

(52) U.S. Cl.
CPC ................................ *H02M 3/33546* (2013.01)

(58) Field of Classification Search
CPC .... H02H 1/06; H02M 1/34; H02M 2001/346; H02M 3/155; H02M 3/33592; H02M 3/33546; Y02B 70/1475; Y02B 70/1491
See application file for complete search history.

(56) References Cited

U.S. PATENT DOCUMENTS

| | | | | |
|---|---|---|---|---|
| 5,943,225 A | * | 8/1999 | Park | H02M 1/34 363/126 |
| 6,452,815 B1 | * | 9/2002 | Zhu | H02M 1/34 363/17 |
| 6,583,997 B1 | * | 6/2003 | Reid | H02H 1/06 363/50 |
| 6,587,356 B2 | * | 7/2003 | Zhu | H02M 1/34 323/908 |
| 7,233,507 B2 | * | 6/2007 | Schenk | H02M 1/34 323/222 |
| 2003/0198064 A1 | * | 10/2003 | Zhu | H02M 3/33576 363/21.01 |
| 2011/0013429 A1 | * | 1/2011 | Campbell | B60K 1/04 363/40 |

* cited by examiner

*Primary Examiner* — Adolf Berhane
*Assistant Examiner* — Henry Lee, III

(57) ABSTRACT

A protection circuit protects transistors in a DC-DC conversion circuit from over voltages. The transistors in the conversion circuit include first and second transistors. Converted energy is driven across a transformer by an H-bridge circuit. With a first configuration of the H-bridge circuit, a third transistor is turned on to discharge an inductor that was previously charged. The inductor is coupled to the third transistor. The discharging of the inductor boosts an output current of the conversion circuit. A capacitor is charged through a diode. The capacitor and diode are disposed in the protection circuit. The diode is coupled to the first transistor and the charging of the capacitor is effective to limit voltage across the first transistor.

14 Claims, 3 Drawing Sheets

DC-DC CONVERSION CIRCUIT AND METHOD OF PROTECTING DEVICES THEREIN

TECHNICAL FIELD

This application relates to power conversion circuits and, more specifically to protecting devices within these circuits.

BACKGROUND OF THE INVENTION

Batteries (and sometimes multiple batteries) are used to power various types of systems. For example, batteries are used to power electric vehicles or hybrid electric vehicles. The batteries in these systems can be configured as packs of batteries that provide voltages in the 150-600 volt range.

However, the accessories that are used in the same vehicles typically require voltages that are much less than 150-600 volts. As such, the vehicle must have a conversion apparatus or circuit that reduces the battery voltage to an acceptable level. One such conversion system that can be used is a DC-DC converter. In some examples, the DC-DC converter reduces the voltage from the 150-600 volt range to a 12 volt value (or less).

Although DC-DC converters have been used, they typically have operational issues and limitations. For instance, the conversion circuitry in the DC-DC converter typically utilizes transistors. Transistors can be damaged or destroyed when too high a voltage is applied. Some previous approaches have relied exclusively on resistors capacitors and diodes to limit the voltages that can be applied to the transistors. However, this approach wastes energy that can be used in the system as excess energy and voltage is simply burned away by the resistor. Electric or hybrid vehicles need to conserve as much energy as possible and wasted energy runs counter to this goal.

In summary, previous attempts at overcoming these problems have not generally been successful. These previous systems and approaches had resulted in poor energy conversion efficiency ultimately resulting in user dissatisfaction or lack of consumer interest.

BRIEF DESCRIPTION OF THE DRAWINGS

For a more complete understanding of the disclosure, reference should be made to the following detailed description and accompanying drawings wherein.

Figure 1:
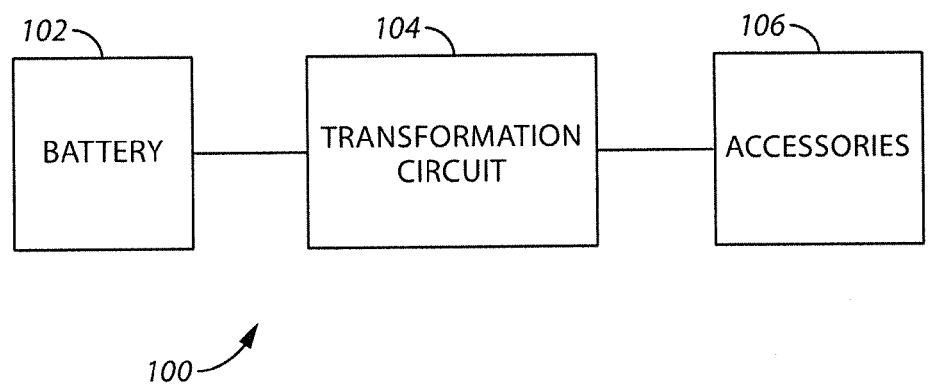
FIG. 1 comprises a block diagram of a system that system that uses DC-DC conversion circuit with over-voltage protection according to various embodiments of the present invention.

Skilled artisans will appreciate that elements in the figures are illustrated for simplicity and clarity. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are described herein that clamp or limit the voltages applied to transistors in a DC-DC conversion circuit. Specifically and in one example, a battery circuit (e.g., a battery pack) supplies voltage, current, and power to a DC-DC conversion circuit. The DC-DC conversion circuit converts the high DC voltage of the battery into a reduced voltage. This operation is accomplished in part by the use of transistors. A voltage protection circuit operates to limit the voltage that is applied to the transistors. The approach uses combinations of transistors, capacitors, inductors, and diodes to actively limit the voltage to the driver transistors of the DC-DC conversion circuit. The approaches described herein also re-cycle energy. In other words, the energy that is prevented from being applied to the transistors is stored and then utilized by loads (e.g., vehicle accessories) that are coupled to the DC-DC conversion circuit, instead of being lost (e.g., burned away by resistors).

In many of these embodiments, a protection circuit protects transistors in a DC-DC conversion circuit from over voltages. The transistors in the conversion circuit include a first transistor and a second transistor. Converted energy is driven across a transformer by an H-bridge circuit. With a first configuration of the H-bridge circuit, a third transistor in a protection circuit is turned on to discharge an inductor in the DC-DC conversion circuit that was previously charged. The inductor is coupled to the third transistor. The discharging of the inductor boosts an output current of the conversion circuit. A capacitor is charged through a diode. The capacitor and diode are disposed in the protection circuit. The diode is coupled to the first transistor and the charging of the capacitor is effective to limit voltage across the first transistor.

In other aspects and with a second configuration of the H-bridge circuit, the first transistor is turned on. The inductor is continued to discharge to completion thereby boosting the output current of the conversion circuit. The capacitor is discharged by turning on a fourth transistor in the protection circuit, and the fourth transistor is coupled to the diode. The turning on of the fourth transistor charging a second inductor that is coupled to the fourth transistor.

In other aspects, the H-bridge utilizes four transistors that are selectively actuated. In other examples, the output current is utilized by a load. In still other examples, the load comprises a vehicle accessory.

In other aspects, a battery supplies voltages to the H-Bridge circuit. In yet other aspects, the battery is a battery pack in a hybrid or electric vehicle.

Referring now to FIG. 1, a system that provides over voltage protection for transistors is described. The system 100 includes a battery 102, a transformation circuit 104, and accessories 106. This example system is configured and arranged for use in a vehicle, but it will be appreciated that it can also be applied to other applications or utilized in other environments not limited to vehicles.

The battery 102 may be one or more batteries. If one or more batteries are used, the individual batteries are coupled together in a battery pack to produce a DC voltage and current. For example, the voltage may be in the 150-600 DC volt range when the battery pack is used in an electric or hybrid vehicle.

The transformation circuit 104 transforms the voltage from the battery 102 into a lower (or higher) voltage. In one example, the transformation circuit 104 is a DC-DC converter that uses an H-bridge to drive energy across a transformer. A rectifier circuit within the DC-DC converter rectifies the voltage and the rectifier circuit includes one or more transistors that drive the rectified voltage (and current) to the accessories 106. In one example, 200V DC is converted to 12V DC. Other examples are possible.

The rectifier circuit is coupled to a voltage limiting or protection circuit that clamps or otherwise limits the voltage that can be applied to these transistors and also controls when the transistors are activated. The protection circuit not only limits the voltage to be applied to the transistors but also re-cycles energy. In other words, the energy that is prevented from being applied to the transistors is stored and then utilized by loads (e.g., vehicle accessories 106) that are coupled to the DC-DC conversion circuit. The structure and usage of this protection circuit is described in detail elsewhere herein.

Figure 2:
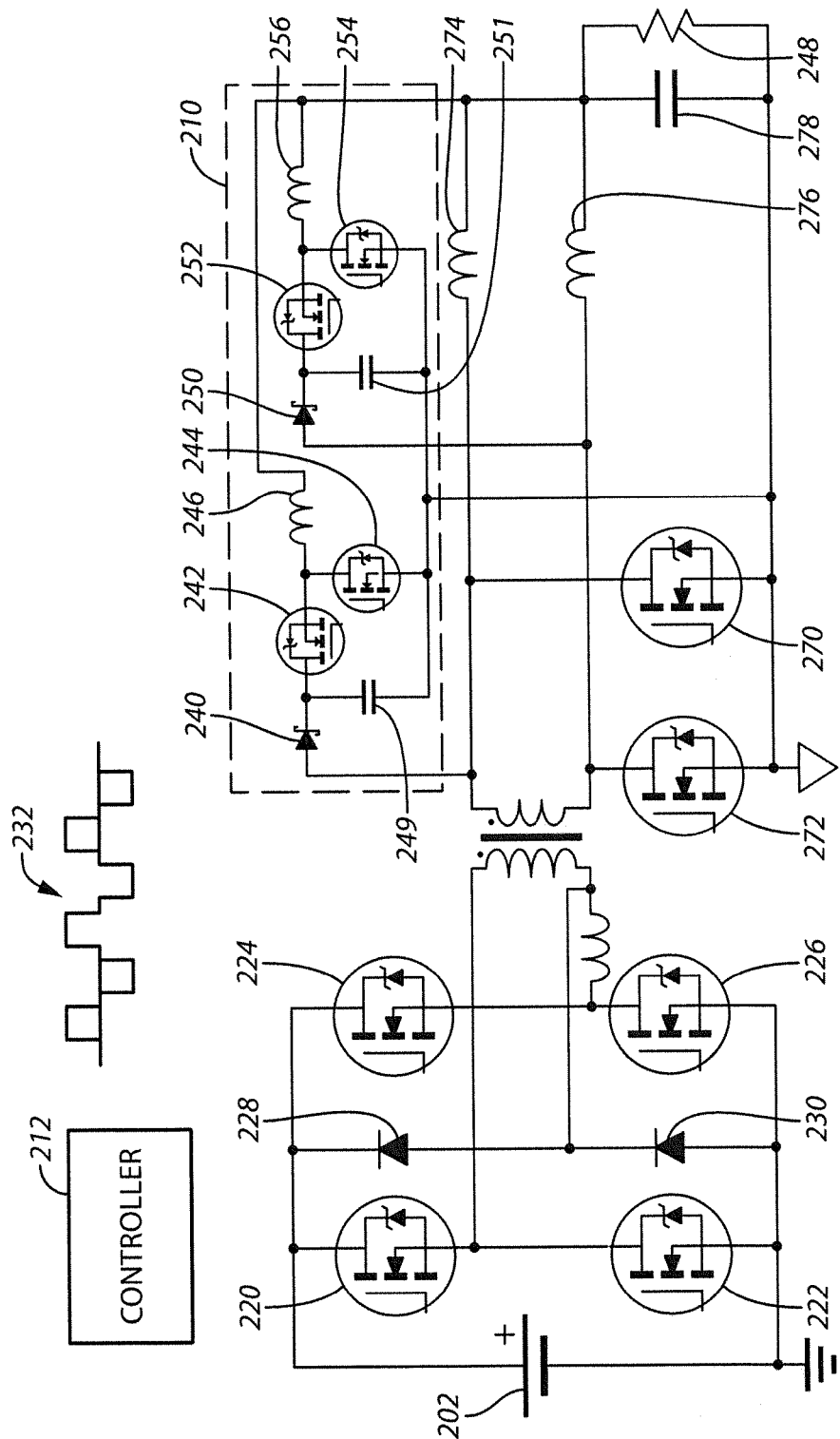
FIG. 2 comprises a circuit diagram of a voltage conversion circuit with a protection circuit that limits voltages on the transistors of DC-DC conversion circuits according to various embodiments of the present invention.

Referring now to FIG. 2, a circuit diagram with a protection circuit disposed in a DC-DC converter circuit is described. The circuit includes a battery pack 202, a bridge circuit 204 (H-bridge), a transformer 206, a synchronous current doubler rectifier 208, and an active snubber or protection circuit 210. The transistor operation is controlled by a controller 212.

The bridge circuit 204 includes a first transistor 220 ($M_a$), a second transistor 222 ($M_b$), a third transistor 224 ($M_c$), a fourth transistor 226 ($M_d$), a first diode 228, and a second diode 330. The transistors 220, 222, 224, and 226 operate in a first pair (transistor 220 and 226), a second pair (transistor 220 and 224), a third pair (224 and 222) and a fourth pair (222 and 226). That is, full bridge transistors are turned on and off in pairs to alternately charge and discharge the transformer primary, producing waveform 232. The waveform 232 is the AC voltage transformed by the transformer 206, rectified, and presented to the load 248. As mentioned, the load 248 may be vehicle accessories (e.g., windshield wipers, radios, stereos, lights, head lamps, pumps, other batteries, or nay combination of these elements to mention a few examples).

The active protection circuit 210 is now described. It includes diode 240 ($D_{s1}$), a transistor 242 ($M_{s1a}$), a transistor 244 ($M_{s1b}$), an inductor 246 ($L_{s1}$). The inductor 246 ($L_{s1}$) is coupled to a load 248. A capacitor 249 ($C_{s1}$) is connected to the transistor 242 ($M_{s1a}$) and diode 240 ($D_{S1}$). The snubber or protection circuit 210 includes second diode 250 ($D_{S2}$), a transistor 252 ($M_{s2a}$), a transistor 254 ($M_{s2b}$), and an inductor 256 ($L_{s2}$). The inductor 256 ($L_{s2}$) is coupled to the load 248. A capacitor 251 ($C_{s2}$) is connected to the transistor 252 ($M_{s2a}$) and diode 250 ($D_{S2}$).

The controller 212 is coupled to and controls the operation of the various transistors. The controller 212 is programmed to selectively actuate or de-actuate the various transistors in the circuit.

The synchronous doubler rectifier circuit 208 includes a transistor 270 ($M_1$), a transistor 272 ($M_2$), an inductor 274 ($L_{O1}$), another inductor 276 ($L_{O2}$), and a capacitor 278 ($C_O$).

Figure 3:
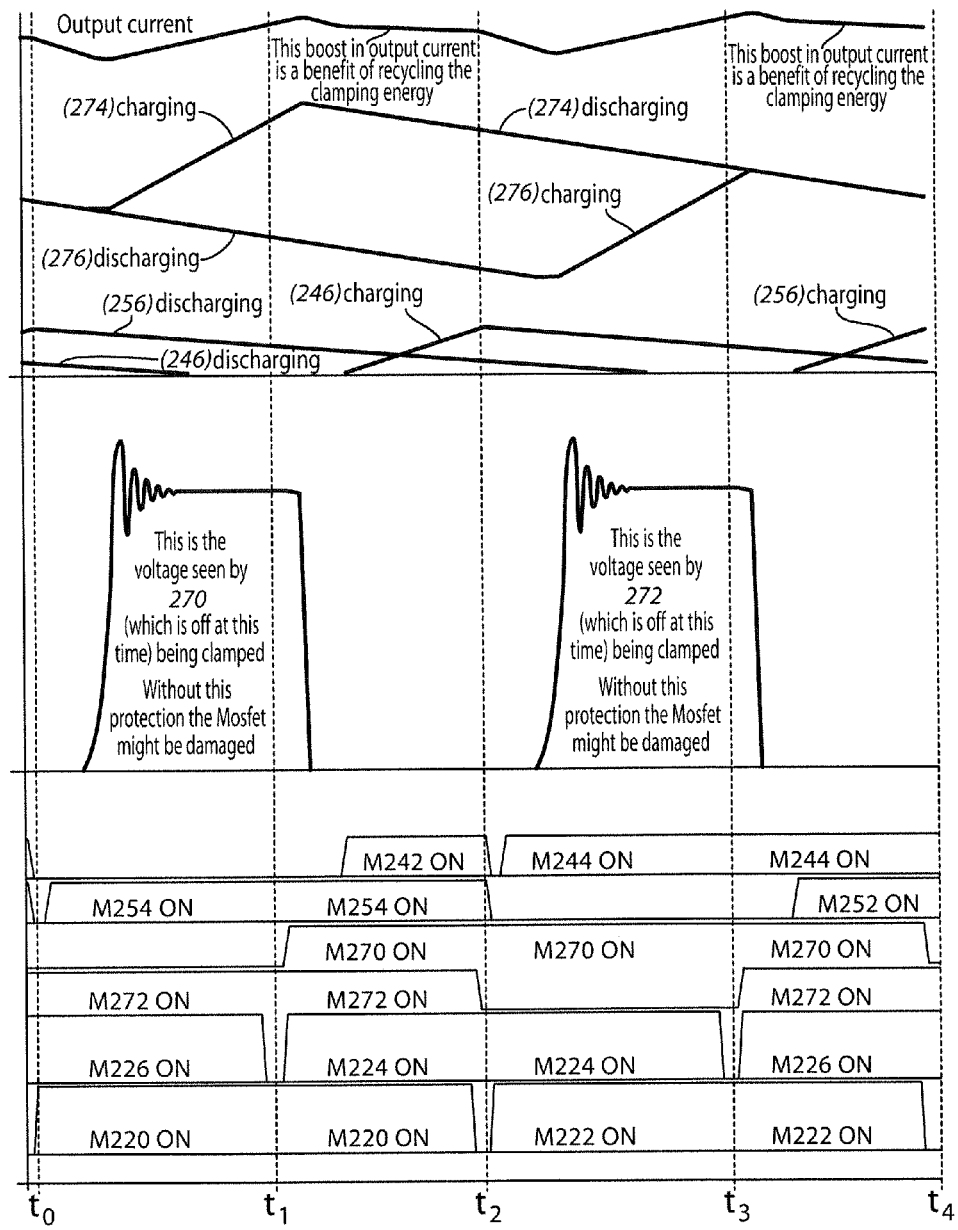
FIG. 3 comprises three graphs showing the operation of the approaches for limiting voltages to transistors in DC-DC conversion circuits according to various embodiments of the present invention.

Referring now to FIG. 3, multiple graphs showing how the transistors are activated and deactivated are described. FIG. 3 assumes the circuit of FIG. 2 is used and the components that are referenced with respect to FIG. 3 refer to the components described with respect to FIG. 2. Three graphs are presented: a top graph showing the charging and discharging of inductors, a middle graph showing the absolute value of the voltage ($V_T$) across transistors 270 and 272 ($M_1$ and $M_2$), and a bottom graph showing the state of the various transistors in the system.

In one example of the operation of FIG. 2 and also referring to FIG. 3, transistors 226 and 272 are on from operation in a previous stage, transistors 220 and 254 are turned on, and transistor 270 is turned off by controller 212. Transistor 270 allows lossless discharge of inductor 256 charged at a previous stage. Given the configuration of the H bridge, the voltage across the drain to source of transistor 270 becomes positive and, therefore, diode 240 starts conducting to charge capacitor 249, effectively clamping the voltage seen by transistor 270 to a safe level. During this stage inductor 274 is charged. These operations occur between times t0 and t1 in FIG. 3.

Then, on a consecutive stage of operation, controller 212 turns transistor 226 off and transistors 224, 270 and 242 on. Transistors 220, 272 and 254 remain on an unchanged state (i.e., on). With transistors 220 and 224 on, the voltage at the secondary is zero, therefore the current doubler rectifier inductors 274 and 276 discharge. During this zero volt stage at the secondary neither diode 240 nor diode 250 conduct. Transistor 242 is turned on to lossless discharge capacitor 249 through inductor 246, therefore charging inductor 246. These operations occur between times t1 and t2 in FIG. 3.

Then, on a further consecutive stage of operation, controller 212 turns transistors 222 and 244 on and transistors 272, 254 and 242 off. Transistors 224 and 270 remain on an unchanged state (i.e. on). Transistor 244 allows lossless discharge of inductor 246 charged at a previous stage. Given the configuration of the H bridge, the voltage across the drain to source of transistor 272 becomes positive and, therefore, diode 250 starts conducting to charge capacitor 251, effectively clamping the voltage seen by transistor 272 to a safe level. During this stage inductor 276 is charged. These operations occur between times t2 and t3 in FIG. 3.

Then, on a last stage of four that repeats over time, controller 212 turns transistor 224 off and transistors 226, 272 and 252 on. Transistors 222, 270 and 244 remain on an unchanged state (i.e. on). With transistors 222 and 226 on, the voltage at the secondary is zero, therefore the current doubler rectifier inductors 274 and 276 discharge. During this zero volt stage of operation at the secondary neither diode 240 nor diode 250 conduct. Transistor 252 is turned on to lossless discharge capacitor 251 through inductor 256, therefore charging inductor 256. These operations occur between times t3 and t4 in FIG. 3.

It should be understood that the controller or the external devices that comprise the load may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices utilized or described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or non-volatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of protecting transistors in a DC-DC conversion circuit, the transistors in the conversion circuit including a first transistor and a second transistor, converted energy being driven across a transformer by an H-bridge circuit, the method comprising:

with a first configuration of the H-bridge circuit:
turning on a third transistor in a protection circuit to discharge an inductor in the DC-DC conversion circuit that was previously charged, the inductor coupled to the third transistor, the discharging of the inductor boosting an output current of the DC-DC conversion circuit; and
charging a capacitor through a diode, the capacitor and diode being disposed in the protection circuit, the diode being coupled to the first transistor, the charging of the capacitor being effective to limit voltage across the first transistor; and with a second configuration of the H-bridge circuit:
turning on the first transistor;
continuing the discharging of the inductor to completion thereby boosting the output current of the DC-DC conversion circuit; and
discharging the capacitor by turning on a fourth transistor in the protection circuit, the fourth transistor being coupled to the diode, the turning on of the fourth transistor charging a second inductor coupled to the fourth transistor.

2. The method of claim 1, wherein the H-bridge utilizes four transistors that are selectively actuated.

3. The method of claim 1, wherein the output current is utilized by a load.

4. The method of claim 3, wherein the load comprises a vehicle accessory.

5. The method of claim 1, wherein a battery supplies voltages to the H-Bridge circuit.

6. The method of claim 1, wherein energy associated with limiting the voltage across the first transistor is utilized by a load.

7. The method of claim 5, wherein the battery is a battery pack in a hybrid or electric vehicle.

8. A DC-DC conversion circuit, comprising:
a first transistor and a second transistor for receiving converted energy being across a transformer from an H-bridge circuit, the first transistor and the second transistor being coupled to a load;
an inductor; and
a protection circuit coupled to the first transistor and the second transistor, the protection circuit including a third transistor, a capacitor, and a diode, the diode being coupled to the first transistor;
wherein with a first configuration of the H-bridge circuit, the third transistor in the protection circuit is turned on to discharge the inductor that was previously charged, the inductor coupled to the third transistor, the discharging of the inductor boosting an output current of the DC-DC conversion circuit, wherein the capacitor is charged through a diode, the capacitor and diode being disposed in the protection circuit, the charging of the capacitor being effective to limit voltage across the first transistor; and
wherein with a second configuration of the H-bridge circuit the first transistor is turned on, the inductor continues to discharge to completion thereby boosting the output current of the DC-DC conversion circuit, and the capacitor is discharged by turning on a fourth transistor in the protection circuit, the fourth transistor being coupled to the diode, the turning on of the fourth transistor charging a second inductor coupled to the fourth transistor.

9. The circuit of claim 8, wherein the H-bridge includes four transistors that are selectively actuated.

10. The circuit of claim 8, wherein the output current is utilized by the load.

11. The circuit of claim 10, wherein the load comprises a vehicle accessory.

12. The circuit of claim 8, wherein a battery supplies voltages to the H-Bridge circuit.

13. The circuit of claim 12, wherein the battery is a battery pack in a hybrid or electric vehicle.

14. The circuit of claim 8, wherein energy associated with limiting the voltage across the first transistor is utilized by a load.

* * * * *